US006470361B1

(12) United States Patent
Alpern et al.

(10) Patent No.: US 6,470,361 B1
(45) Date of Patent: *Oct. 22, 2002

(54) METHOD AND APPARATUS FOR PERFORMING GENERATIONAL GARBAGE COLLECTION USING MIDDLE-AGED OBJECTS

(75) Inventors: Bowen Alpern, Peekskill; Clement Richard Attanasio, Cortlandt Manor; Stephen Edwin Smith, Mahopac, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,186

(22) Filed: Jan. 10, 2000

(51) Int. Cl.$^7$ ............................................... G06F 12/00
(52) U.S. Cl. ........................................... 707/206; 707/1
(58) Field of Search ...................................... 707/206, 1

(56) References Cited

U.S. PATENT DOCUMENTS 5,930,807 A    7/1999   Ebrahim et al.
6,226,653 B1 *  5/2001   Alpern et al. ............... 707/206

OTHER PUBLICATIONS

Andrew W. Appel, "Simple Generational Garbage Collection and Fast Allocation," Software: Practice and Experience, 19(2): 171–183, Feb. 1989.
Hosking et al., "A Comparative Performance Evaluation of Write Barrier Implementations," ACM Conference on Object–Oriented Programming Systems, Languages, and Applications, pp. 92–109 Oct. 1992.
Urs Holzle, "A Fast Write Barrier for Generational Garbage Collectors," OOPSLA '93 Garbage Collection Workshop, Oct. 1993.
Agesen et al., "Garbage Collection and Local Variable Type–Precision and Liveness in Java™ Virtual Machines," Programming Language Design and Implementation, Jun. 1998.

* cited by examiner

*Primary Examiner*—Kim Vu
*Assistant Examiner*—Hung Pham
(74) *Attorney, Agent, or Firm*—Ryan, Mason & Lewis, LLP; Casey P. August, Esq.

(57) ABSTRACT

A method and apparatus are provided for the efficient management of remembered sets in a generational garbage collection scheme. The present invention detects when an old object has a pointer to a young object, and needs to be added to the remembered set. A write buffer and a temporary buffer are used to create and maintain the remembered set. Entries in the write and temporary buffers are used as part of the root set for creating the remembered set for the next garbage collection. A barrier bit associated with each object differentiates generations in the generational garbage collection scheme and is used to determine whether to make an entry into a write buffer when a reference to another object is stored into an object. Objects that have survived one or more collections, but not the minimum number, N, of collections to be considered an old object are referred to as "middle-aged" objects. During a minor garbage collection, the write buffer is scanned. Objects identified in the write buffer are transferred to the remembered set for the next cycle if the object is (i) an old object pointing to a younger object, or (ii) a middle-aged object that is determined to be live. Middle-aged objects identified in the write buffer that are not yet known to be live are transferred to the temporary buffer. At the end of the minor collection, the temporary buffer is processed and objects that are then known to be live are transferred into the remembered set.

35 Claims, 10 Drawing Sheets

1300

1400

METHOD AND APPARATUS FOR PERFORMING GENERATIONAL GARBAGE COLLECTION USING MIDDLE-AGED OBJECTS

CROSS REFERENCE TO RELATED APPLICATIONS

The present invention is related to U.S. patent application Ser. No. 09/480,189, entitled "Method And Apparatus For Performing Generational Garbage Collection Using Barrier Bits," and U.S. patent application Ser. No. 09/480,190, entitled "Method And Apparatus For Performing Generational Garbage Collection Using Remembered Set Counter," filed contemporaneously herewith, assigned to the assignee of the present invention and incorporated by reference herein.

FIELD OF THE INVENTION

The present invention relates generally to garbage collection mechanisms that automatically recover memory that is no longer in use by an operating system nor application programs in a computer system, and more particularly to a system and method for reducing computational overhead associated with such garbage collection mechanisms.

BACKGROUND OF THE INVENTION

Modern programming systems that support object-oriented data models often provide automatic storage management, thereby freeing the programmer from the requirement of explicitly requesting storage for data from the system, and, more importantly, offering storage when it is no longer needed. The latter requirement has historically been the source of many and the most troublesome program bugs. Automatic recovery of storage no longer in use is often referred to as garbage collection.

Garbage collection is a complex topic that has been the subject of many technical articles and at least one text book. The following is a simplified explanation of dynamic memory allocation and garbage collection. For a more detailed discussion of basic garbage collection technology, see, for example, Richard Jones and Rafael Lins, "Garbage Collection," John Wiley & Sons Ltd., 1996, U.S. Pat. Nos. 5,088,036, and 5,930,807, all of which are incorporated by reference in their entirety.

Referring to FIG. 1, there is shown a typical computer system 100 having a central processing unit (CPU) 102, user interface 106, and main memory 108. The main memory 108 stores an operating system 110 and one or more application programs 112 (one shown). The operating system 110 and application programs 112 comprise processes (also called threads or tasks) that include program code and data (such as constants, local variables and other parameters) used in the execution of the program code. In addition, the main memory 108 stores at least one heap 116 used for dynamic memory allocation. The space in main memory 108 allocated to store the operating system 110, application programs 112, and the heap 116 need not be contiguous. For example, pages or possibly larger contiguous chunks of main memory can be typically linked together using tables or other well known prior art mechanisms.

The program code and data stored in main memory 108 refers to objects. The term "object" is herein defined to mean any data structure created by a process. The heap 116 stores such objects. More specifically, when a process spawns an object, a memory allocation routine 118 in the operating system is called. The memory allocation routine 118 responds by allocating a region in the heap 116 for storing the object.

The representation of the object in the heap may vary. In object-oriented programming systems, for example, an object typically contains the variables declared in the object's class and all of the object's super classes. It should be noted that the heap 116 may store additional information related to the objects, the details of which are not relevant to the present invention.

The program code and associated data stored in main memory 108 use a reference to point to the representation of a given object in the heap 116. Such a reference is referred to herein as an "object reference." The object reference maybe direct or indirect. A direct object reference identifies the location in main memory for the object (for example, the location in main memory of the header of the object). On the other hand, an indirect object reference points to an object handle, which can be used to locate the location in main memory for the object. In this document, the term object reference refers to both direct and indirect object references.

The memory allocation routine 118 discussed above may occur repeatedly. Clearly, if this routine continued unabated, all of the space in the heap 116 would be exhausted. Therefore, space in the heap 116 must be restored by either explicit action of the program, or some other mechanism.

The solution to this problem is to recover blocks of memory space in the heap 116 that are no longer being used by the active processes. Garbage collection is a term that refers to automatic methods of recovering unused memory in the heap 116. Garbage collection is based on the fact that if no pointer to a heap object exists anywhere in the executing environment of a program, the object can never again be accessed and therefore the storage occupied by the object can be reused for another object. Garbage collection comprises the identification of all reachable objects, i.e., those that can be accessed by the executing program. All reachable objects are identified by marking all objects pointed to by the roots of a programs (i.e., local variables and static variables) and all objects pointed to by objects pointed to by roots, recursively, until all reachable objects have been identified. Reached objects are considered "live" and are kept. Objects which are not reached are considered "dead" and their storage space is made available for future allocations.

A garbage collection routine 120 typically gathers and recovers unused memory upon the occurrence of a pre-defined event, such as the expiration of a predetermined time period or the available heap memory reaches a predefined threshold. A large number of different garbage collection methodologies have been proposed. For a discussion of the state of the art, see, for example, Jones and Lin, "Garbage Collection, " John Wiley and Sons Ltd, 1996, incorporated by reference in its entirety above.

One way to make garbage collection more efficient, and to reduce the length of system pauses caused by garbage collection, is to reduce the number of objects that need to be processed during a given garbage collection cycle using a generational garbage collection scheme. Generational schemes are based on the observations that most objects have short lifetimes, dying shortly after they are allocated, and that objects which do not die quickly and have been reachable for some time will continue to be reachable (i.e. live). Generational schemes partition the objects in the heap into groups called "generations," based upon the ages of the objects, where an object's age is typically measured in terms of the number of garbage collections that the object has survived. For this discussion, consider two generations, a "young" generation of recently allocated objects, and an "old" generation of objects which have survived some minimum number of collections. Typically, the young generation is much smaller than the older generations.

Generational schemes perform frequent collections of the young generation, and only occasionally do full collections of the entire heap. Typically, generational schemes perform a minor garbage collection upon the occurrence of a predefined event (such as the expiration of a predetermined time period or the available heap memory reaches a predefined threshold). The minor garbage collection routine identifies younger generation objects that are not reachable from the objects stored in the heap, and identifies the space in the heap previously allocated to one or more of these objects as a candidate for reclamation. Less frequently, a major garbage collection routine is performed that identifies all objects that are not reachable from the objects stored in the heap, and identifies the space in the heap previously allocated to one or more of these objects as a candidate for reclamation.

FIG. 2 shows a system in which the heap 116 has been logically divided into three generations: Generation 0 stores the youngest objects, Generation 1 stores objects that have persisted for at least N garbage collection cycles (where N is typically a value between 1 and 4), and Generation 2 stores the oldest objects in the system. The simplest policy is to advance all live objects from one generation to the next oldest generation each time a generational garbage collection is performed. Another technique is to divide the youngest generation into an object creation space and an aging space. Objects are initially allocated in the creation space. The aging space holds survivors from the creation space. Objects are promoted to the next older generation only after surviving N garbage collection cycles.

One of the biggest problems with generational garbage collectors is handling inter-generation object references whereby the only reference(s) to an object in one generation may be stored in object(s) in another generation. FIG. 2 shows a number of inter-generational references 170. If the only reference to an object is an inter-generational reference, or more generally, if the only path from a root set reference to an object requires traversal of an inter-generation object reference, the object would be improperly deleted by the garbage collection routine unless all inter-generational references were taken into account during garbage collection. However, scanning the older generation heap areas for inter-generational references each time a younger generation heap area is garbage collected would take away some of the efficiency achieved by using generational garbage collection.

If scanning older generations during collection of younger generations is ruled out as too inefficient, then another mechanism has to be developed to keep track of references in older generation objects that point to newer generation objects. One such mechanism utilizes a "remembered set" that identifies (for example, by storing a pointer to) each older generation object that contains a reference to a younger generation object. In this scheme, at every store operation, a software procedure (typically referred to as a "write barrier") ensures that the updated location is stored in the remembered set if the store creates a reference from an older generation object to a younger generation object.

The remembered set is obtained by monitoring, by software or hardware means, the execution of the processes in such a way that all stores of pointers to new objects into old objects can be discovered. Such old objects become members of the remembered set, which is used during the next and subsequent minor garbage collections.

More specifically, in the next and subsequent minor garbage collections, the members of the remembered set are treated as part of the root set of object references from which the set of reachable younger generation objects is generated. Those younger generation objects that are not part of this set are identified as younger generation objects that are not reachable from the objects stored in the heap, and the space in the heap previously allocated to one or more of these unreachable objects is identified as a candidate for reclamation.

Various schemes have been proposed to monitor stores into old objects so that they can be identified and the remembered set updated accordingly. The modified old objects are scanned to determine if they contain pointers to young objects. Recording the information must be as efficient as possible, and as precise as possible. This forces one to make a tradeoff between efficiency and preciseness.

One traditional way of identifying stores into old objects is referred to as "card marking," wherein the heap is divided into fixed-size subsets and associated with each subset is a "card," i.e., a storage location. On every store into the portion of the heap that contains old objects, the card associated with the heap address stored into is marked. At collection time, the entire heap subset associated with all marked cards is scanned for pointers to new objects. A more detailed description of exemplary card marking schemes is set forth in Paul R. Wilson and Thomas G. Moher, "A Card-Marking Scheme for Controlling Intergenerational References in Generation-Based GC on Stock Hardware," SIGPLAN Notices 24(5), pp. 87-92 1989, and Urs Holzle, "A Fast Write Barrier for Generational Garbage Collectors," presented at OOPLSA '93 Garbage Collection Workshop, Washington, D.C., October, 1993, available at http://www.sunlabs.com/research/self/papers/write-barrier.html, hereinafter incorporated by reference in their entirety.

The card marking scheme is efficient in two ways. First, the card marking is accomplished by a small number of shifts to find the card to be marked, and one store. In addition, if multiple stores into the same card are performed, at collection time the associated heap subset is scanned only once. However, at collection time, the entire heap subset for each marked card must be scanned rather than just the (possibly) one object stored into. In addition, some scheme for finding object boundaries in the heap is required, or else the scan must be conservative. The executing code may or may not be able to distinguish efficiently between stores of object pointers and stores of scalar values, in which case more cards will be marked than necessary. This effect always happens when the monitoring is done by hardware memory protection mechanisms, as it is in some proposals. Thus, in summary, the card marking imposes too much of a burden on the collection process in the interest of minimizing the cost for the first store of required information.

As an alternative to card marking, one can accumulate a buffer of pointers to objects which have been modified, and, more particularly, objects that have been modified by stores of pointers. The buffer may include the values stored as well as the addresses of the objects stored into. An exemplary buffer scheme is described in detail in "A Comparative Performance Evaluation of Write Barrier Implementations," Antony L. Hosking, J. Eliot B. Moss and Darko Stefanovic, Proc. of the ACM Conference on Object-Oriented Programming Systems, Languages, and Applications, pp. 92-109 (Vancouver, Canada, October 1992). ACM SIGPLAN Notices 27(10), October 1992, available at http://osl-www.cs.umass.edu/, herein incorporated by reference in its entirety.

Compared to card marking, the buffer scheme is more costly to record, but is more precise. However, the buffer may become too large, because of duplicate entries (the same object being stored into more than once), and especially because of unnecessary recording of stores into young objects.

An additional overhead associated with maintaining remembered sets occurs when a young object survives enough garbage collections to be promoted to an older generation. At the time the object is promoted to an older generation, it must be determined if the object contains object references to objects in the younger generation. If the object does contain object references to objects in the younger generation, then the promoted object must be added to the remembered set for the younger generation.

A need therefore exists for a method and apparatus for efficiently managing remembered sets in a generational garbage collection scheme. Specifically, a need exists for an efficient mechanism for detecting when an old object has a pointer to a young object, and needs to be identified in the remembered set. In addition, a further need exists for an efficient mechanism for detecting when an object in the remembered set no longer contains a pointer to a young object, so that the object can be removed from the remembered set.

SUMMARY OF THE INVENTION

Generally, a method and apparatus are provided for the efficient management of remembered sets in a generational garbage collection scheme. In order to manage the remembered set, the present invention provides a first mechanism for detecting when an old object has a pointer to a young object, and needs to be added to the remembered set, and a second mechanism for detecting when an object already in the remembered set no longer contains a pointer to a young object, so that the object can be removed from the remembered set.

The present invention utilizes a write buffer and a temporary buffer to efficiently create and maintain the remembered set in a generational garbage collection scheme. Entries in the write and temporary buffers are used as part of the root set for creating the remembered set for the next garbage collection. Specifically, at the end of each garbage collection, entries in the write and temporary buffers are added to the remembered set for the next garbage collection if the objects satisfy the criterion for membership, i.e., they are live and may contain pointers to objects in a younger generation.

A barrier bit is associated with each object to differentiate generations in the generational garbage collection scheme. In the illustrative embodiment, the barrier bit is initially set to zero when the object is first created and the barrier bit is set to one when the object first survives a garbage collection. The barrier bit is used to determine whether to make an entry into a write buffer when a reference to another object is stored into an object. Specifically, an entry is made in the write buffer only if the barrier bit of the object that is written into is set.

The present invention establishes three general categories of generations in the generational garbage collection scheme. The youngest generation is comprised of objects that are first created and have not yet survived a garbage collection cycle. Objects that have survived one or more collections, but not the minimum number, N, of collections to be considered an old object are referred to herein as "middle-aged" objects. Thus, objects that have survived M garbage collection cycles, where M is between one and N garbage collections, are said to be middle-aged objects. Finally, objects that have survived N garbage collection cycles are said to be "old" objects.

The present invention uses the write buffer and barrier bit to monitor stores of object references into middle-aged or old objects. Middle-aged objects having an object reference which has been modified since the previous garbage collection will be identified in the write buffer. During a minor garbage collection, the write buffer and remembered set are scanned. Objects identified in the write buffer and remembered set are transferred to the remembered set if the object is an old object or a middle-aged object that is determined to be live. Middle-aged objects identified in the write buffer and remembered set that are not yet known to be live are transferred to the temporary buffer. At the end of the minor collection, the temporary buffer is processed, to transfer objects that are then known to be live into the remembered set. For middle-aged objects that are not live at the end of the minor collection, these objects are garbage and their storage is reclaimed.

A more complete understanding of the present invention, as well as further features and advantages of the present invention, will be obtained by reference to the following detailed description and drawings.

DETAILED DESCRIPTION OF PREFERRED EMBODIMENTS

Figure 1:
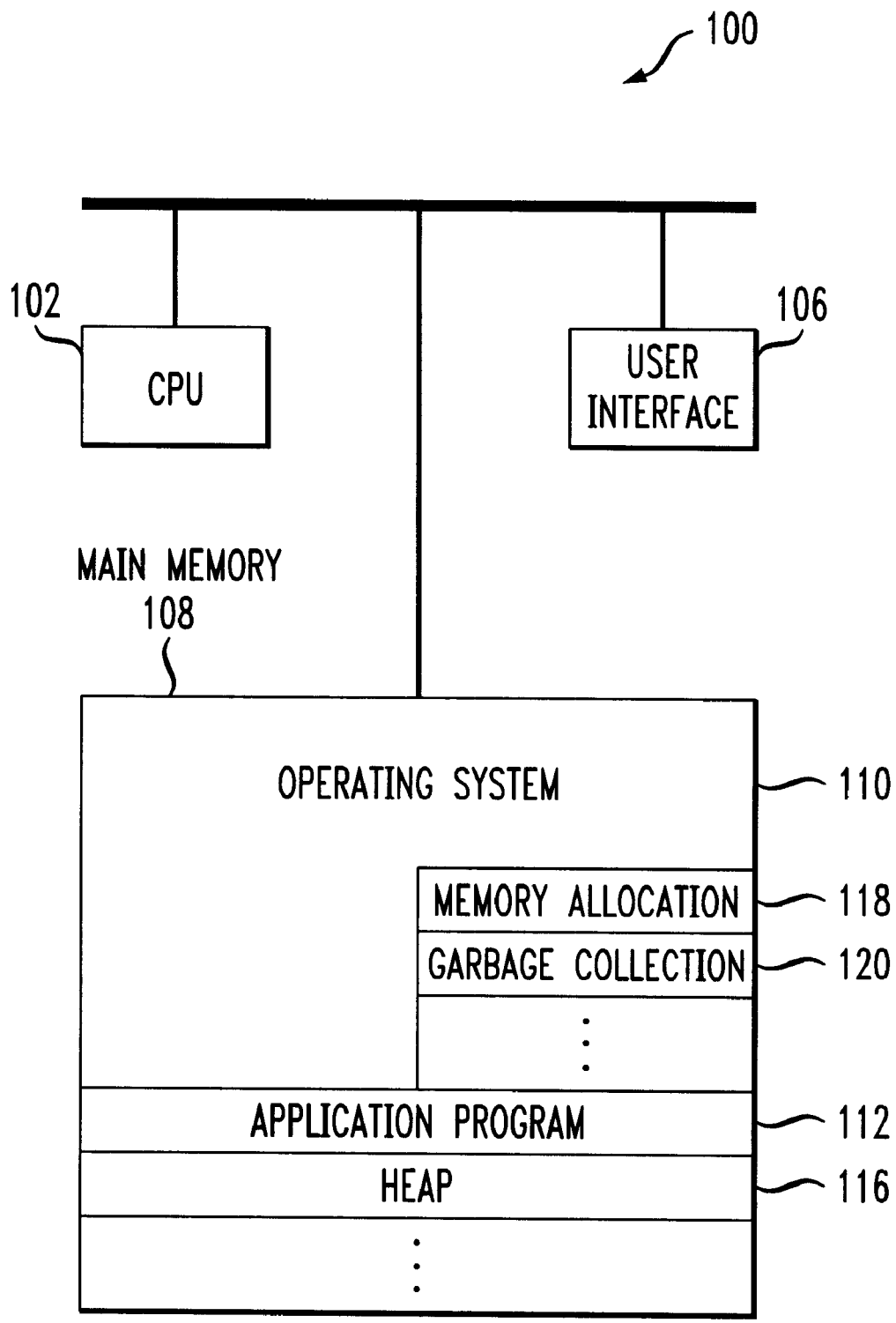
FIG. 1 is a block diagram of a computer system that utilizes a conventional garbage collection mechanism for recovery of memory space used by inaccessible objects.
Figure 2:
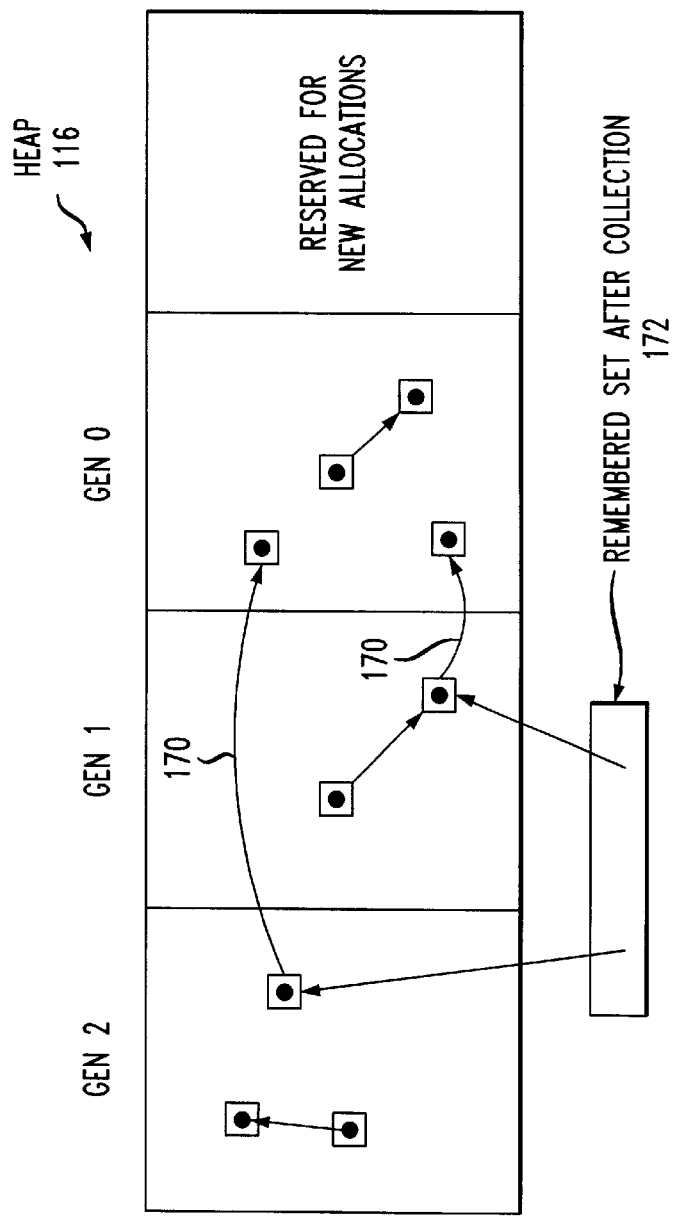
FIG. 2 is a block diagram of a memory heap used for storing objects in a conventional generational garbage collection system.

The present invention may be embodied using the basic system architecture described above in conjunction with FIG. 1 and the generational heap structure discussed above in conjunction with FIG. 2, as modified herein to incorporate the features and functions of the present invention. The present invention relates to the management of the remembered set 172 in a generational garbage collection scheme. In order to manage the remembered set 172, it is important to detect when an old object has a pointer to a young object, and needs to be added to the remembered set 172. In addition, it is important to detect when an object in the remembered set no longer contains a pointer to a young object, so that the object can be removed from the remembered set 172. For example, an object in the remembered set 172 will no longer contain a pointer to a young object because the pointers were changed to point to old objects, or because the young objects that were pointed to survived long enough to themselves become old objects.

The present invention utilizes a write buffer 175, discussed below in conjunction with FIG. 4, to efficiently create and maintain the remembered set 172 in a generational garbage collection scheme. Entries in the write buffer 175 are used as part of the root set for the next garbage collection. Specifically, at the end of each garbage collection, entries in the write buffer 175 are added to the remembered set 172 for the next garbage collection if the objects satisfy the criterion for membership, i.e., they are live and may contain pointers to objects in a younger generation. Thus, the remembered set 172 consists of objects that were in the write buffer at the time of a garbage collection, that must be remembered for the next garbage collection.

According to one feature of the present invention, membership of the remembered set 172 is kept low using a barrier bit associated with each object to differentiate generations in the generational garbage collection scheme. In one illustrative embodiment, the barrier bit is turned on when an object first survives a garbage collection. The barrier bit is used by the present invention to decide whether to make an entry into a write buffer 175 when a reference to another object is stored into an object. An entry is made in the write buffer 175 only if the barrier bit of the object that is written into is set.

One of the phases of a minor garbage collection in accordance with the present invention involves scanning the write buffer 175. If the number of garbage collections that an object must survive to become an old object is greater than 1 (N>1), then objects that are not yet old, referred to herein as "middle-aged" objects, that are found in the write buffer 175 and determined to be live are scanned and then moved to the remembered set 172, which is also to be scanned during minor garbage collections. It is noted that if an object, A, is old, the object A will not necessarily be scanned on the next minor collection. If the object A holds a pointer to an object B which is younger than object A but is not yet old (i.e., if an object needs to survive more than one collection to become old) then object, B, not yet old, may not be seen during the next collection and so will be declared garbage even though object A points to it. Therefore, object A must be remembered and scanned in the next collection, and every collection until B becomes old.

According to one automatic storage management strategy for a generational garbage collection scheme, objects become old after surviving one garbage collection. Thus, under this strategy, remembered set management becomes particularly simple, since the write buffer 175 serves as the remembered set 172, and can be purged at the end of a garbage collection, thereby never containing extraneous entries. This automatic storage management strategy, however, suffers from the disadvantage that objects that are created just before a garbage collection become old prematurely, since they would naturally survive only a short time.

It is again noted that once an object becomes old, the automatic storage management system will keep the object alive at least until the next major collection. Since major collections are comparatively rare and expensive, an old object can thus be expected to survive, occupying its storage, for a significant amount of time. This approach can, in turn, cause garbage collections to occur more frequently. Thus, it is desirable to not automatically declare an object old if it survives only one garbage collection. The object may have been created a very short time before a collection was caused, and may have been fated to become garbage shortly thereafter. Due to the occurrence of the garbage collection, however, the object will occupy its storage for a long time.

Thus, according to one feature of the present invention, an object may be required to survive more than one garbage collection before the object becomes old. Objects which have survived one or more collections, but not the minimum number of collections to be considered an old object are referred to herein as "middle-aged" objects. An object must thus survive N>1 garbage collections before becoming old. Objects which never appear in the write buffer 175 will either become old, having survived N garbage collections, or become garbage and be reclaimed.

According to one feature of the present invention, entries in the remembered set 172 have an associated counter, C, identifying the garbage collection cycle during which the object was placed in the remembered set 172. It is noted that the garbage collection counter, C, may be associated with corresponding entry in various ways. For example, the counter, C, may be stored as part of the entry, or the counter, C, may be stored in an indexed array where each element of the array corresponds to an entry in the remembered set 172. In a further variation, entries in the remembered set 172 associated with a given garbage collection cycle can be logically grouped together, and can automatically expire together.

The present invention assumes that the object inserted into the remembered set 172 points to the youngest possible object. In addition, entries will automatically expire from the remembered set 172 when the garbage collection counter reaches C+N, since the objects pointed to by the object in the remembered set 172 must now themselves be old objects. In this manner, entries in the remembered set 172 expire after N garbage collection cycles, by which time the objects that are pointed to must become old.

Thus, if an old object (one that has survived at least N garbage collections) is found in the write buffer 175 during a minor garbage collection, discussed below in conjunction with FIG. 6, the old object is scanned normally, and is placed into the remembered set 172, with a counter, C, identifying the garbage collection cycle during which the old object was found in the write buffer 175. The counter identifies the age of the youngest possible object pointed to by this object. When the garbage collection count reaches C+N, this entry can be discarded from the remembered set, since the associated object cannot point to any objects that are not old unless another more recent entry in the remembered set 172 or write buffer 175 exists for that object. In this manner, entries in the remembered set 172 expire gracefully, without significant computational overhead. Thus, the age of each object that is pointed to by an object found in the remembered set 172 need be calculated. In other words, the present invention avoids significant computational overhead by assuming that whenever a reference is stored into an object whose barrier bit is turned on, the reference is a pointer to a new object. The cost of this assumption being false is merely retention of an entry in the remembered set 172 for a longer time than necessary.

According to another feature of the present invention, middle-aged objects are processed using a temporary buffer 178, discussed further below in conjunction with FIG. 4. Generally, if a middle-aged object is found in the write buffer 175 (or in the remembered set 172) during a minor garbage collection, the middle-aged object is processed as an old object if the middle-aged object is known to be live (i.e., the object has already been directly or indirectly reached during this garbage collection from roots). The address of the middle-aged object is placed into (or remains in) the remembered set 172 if the object is known to be live or is placed into the temporary buffer 178 if the object is not known to be live. At the end of the minor collection, the temporary buffer 178 is processed, as discussed further below in conjunction with FIG. 11, to transfer objects that are now known to be live into the remembered set 172. Again, all entries in the remembered set 172 contain a pointer to the object and have an associated counter, C, identifying the garbage collection cycle during which the object was placed in the remembered set 172. For objects that are not live, these middle-aged objects are garbage and their storage is reclaimed.

After each minor garbage collection, the entries in the write buffer 175 for old objects, and the entries in the temporary buffer 178 for middled-aged, live objects are moved to the remembered set 172. The entries in the remembered set 172 will expire after N garbage collections.

Major garbage collections are performed less frequently to recover storage for old objects that are no longer live. The processing of major garbage collections in accordance with the present invention is discussed below in conjunction with FIGS. 12 through 16. Generally, during a major garbage collection, all objects are scanned from their roots, and only live objects are retained. The storage occupied by all other objects is reclaimed. During a major collection, the only processing on the write buffer 175 and the remembered set 172 is performed after the full scan. Entries associated with live objects are kept in the remembered set 172; all others are discarded.

Barrier Bit

Figure 3:
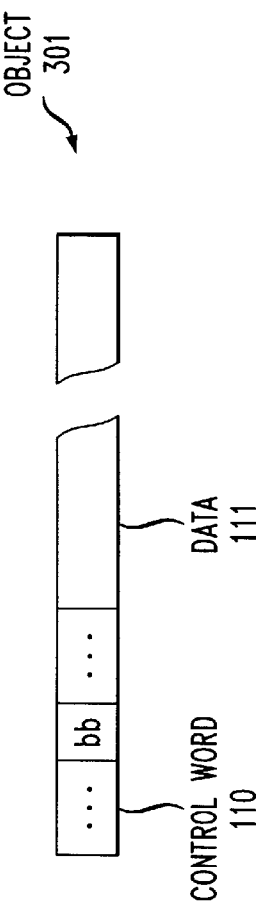
FIG. 3 is a diagram of an object in a heap, including the object's barrier bit in accordance with the present invention.

Generally, the present invention provides a method for recording stores of object references into old objects. As shown in FIG. 3, each object 301 has an associated barrier bit (bb). When an object 301 is first created, the barrier bit (bb) of the object 301 is set to zero (0). In the illustrative embodiment, when the object 301 survives its first garbage collection, the corresponding barrier bit (bb) is set to one (1).

The object 301 includes a control word 110 and object data 111. In the illustrative embodiment, the barrier bit (bb) is part of the control word 110 of the object 301. While the control word 110 and object data 111 are illustrated in FIG. 3 as contiguous in the heap, the control word 110 may be separate from the object data 111, as would be apparent to a person of ordinary skill in the art. In an alternate implementation, control words 110 for objects 301 are kept in a portion of the heap 116 reserved for them, and data fields are elsewhere.

Write Buffer Maintenance

Figure 4:
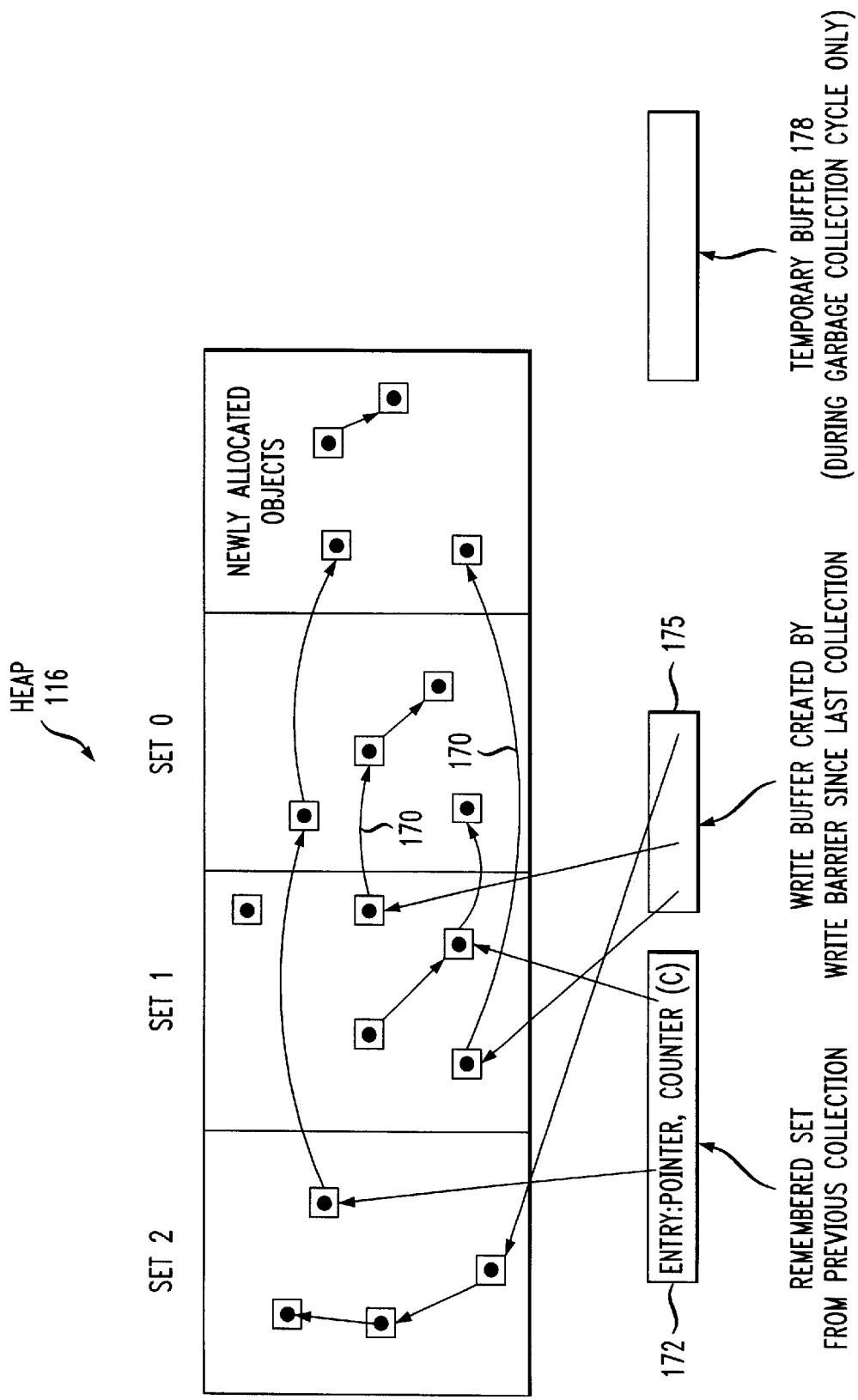
FIG. 4 illustrates the contents of the heap, the remembered set, and the write buffer during the operation of a system embodying this invention, including relevant inter-generational pointers.

FIG. 4 shows a system according to the present invention in which the heap 116 has been logically divided into three generations: Set 0 stores the youngest objects, Set 1 stores middle-aged objects that have persisted for between 1 and N garbage collection cycles (where N is typically a value between 1 and 4), and Set 2 stores the oldest objects in the system that have persisted for at least N garbage collection cycles. Thus, as previously indicated, the barrier bit for all objects in sets 1 and 2 will be set.

As shown in FIG. 4, the present invention utilizes a write buffer 175 to monitor all old objects that have had a reference to another object stored in them since the last garbage collection. The remembered set 172 from the previous garbage collection cycle identifies each older generation object that contains a reference to a younger generation object. As discussed further below in conjunction with FIG. 6, objects in the write buffer 175 are candidates for the remembered set 172. As previously indicated, in accordance with the present invention, each entry in the remembered set 172 contains a pointer to the object and a counter, C, indicating the garbage collection cycle when the object was first added to the remembered set (allowing the entry to expire once the object pointed to must be old).

In addition, the present invention utilizes a temporary buffer 178 during each garbage collection phase, discussed below, to process the middle-aged objects in Set 2. As indicated above, if a middle-aged object is found in the write buffer 175 (or in the remembered set 172) during a minor garbage collection, the middle-aged object is processed as an old object if the middle-aged object is known to be live. The address of the middle-aged object is placed into (or remains in) the remembered set 172 if the object is known to be live or is placed into the temporary buffer 178 if the object is not known to be live. At the end of the minor collection, the temporary buffer 178 is processed as discussed below in conjunction with FIG. 11 to transfer objects that are now known to be live into the remembered set 172. For objects that are not live, these middle-aged objects are garbage and their storage is reclaimed.

Figure 5:
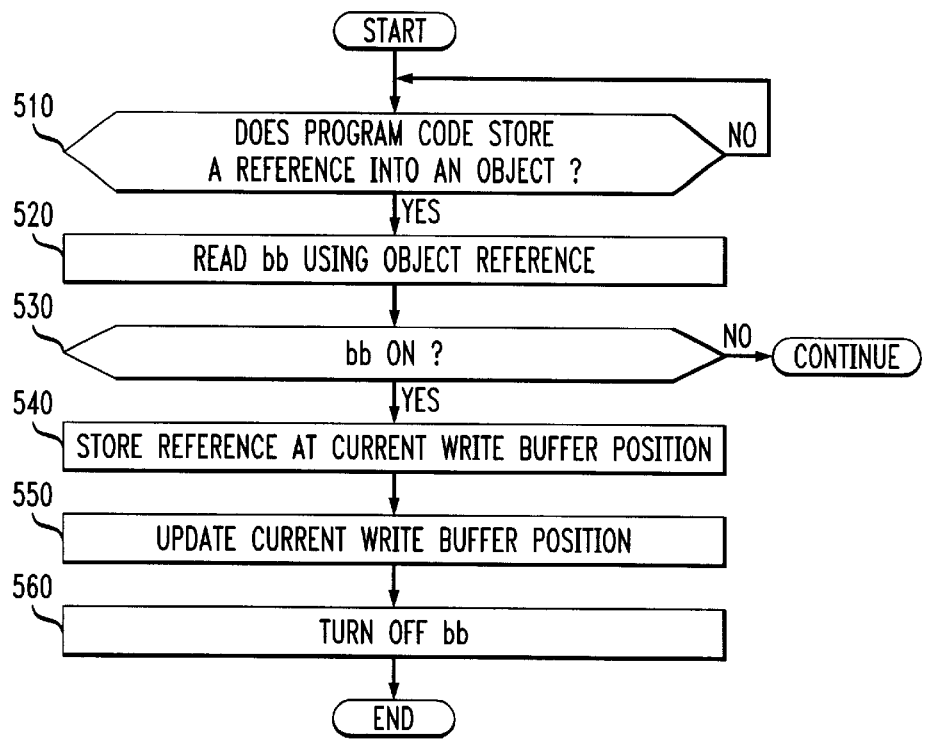
FIG. 5 is a flow chart illustrating the processing of program code that stores an object reference into an object field to support efficient generational garbage collection according to the present invention.

FIG. 5 is a flow chart describing a barrier write process 500 that incorporates features of the present invention. The barrier write process 500 is initiated each time program code 112 stores a reference into an object. The storage of a reference into an object can be detected by hardware or software means, in a known manner. In the illustrative embodiment shown in FIG. 5, the barrier write process 500 continuously monitors all executing program code 112 during step 510 until the process detects that program code is storing a reference into an object.

Once the barrier write process 500 detects that program code is storing a reference into an object, program control proceeds to step 520 where the value of the barrier bit is obtained for the object. A test is performed during step 530 to determine if the barrier bit has been set. If it is determined during step 530 that the barrier bit has not been set, then object is still a young object, or an old object that has already been recorded in the write buffer and had its barrier bit turned off during step 560 (see below) on a previous execution of the barrier write process 500, and not a candidate for storage in the write buffer 175.

If, however, it is determined during step 530 that the barrier bit has been set, then the object is an old or middle-aged object, and the reference stored into the old middle-aged object is potentially to a younger object. Thus, a reference to the object is stored at the current write buffer position during step 540 and the current write buffer position is updated during step 550. In the illustrative embodiment, the write buffer 175 has a simple structure. The write buffer 175 may be stored into by appending to the end of the write buffer 175, and updating the pointer to the next sequential entry of the write buffer 175. In architectures such as IBM PowerPC, commercially available from IBM Corp. of Armonk, N.Y., this can be done with a single "store and update" instruction.

In order to prevent duplicate entries for the current object in the write buffer 175, for example, due to additional references before the next garbage collection, the barrier bit for the object is set to 0 during step 560 before program control terminates. In this manner, subsequent stores into the object before the next garbage collection will not cause an additional entry in the write buffer 175.

Garbage Collection Phase

FIGS. 6 through 11 are flow charts describing various processes that are active during a minor garbage collection phase. As previously indicated, the present invention employs a generational garbage collection scheme that executes mostly minor collections, with occasional major collections chosen according to some algorithm. A minor collection is one during which the space only of young objects which have become garbage is collected. A major collection, discussed further below in conjunction with FIGS. 12 through 16, is one during which the space of all objects which have become garbage is collected.

Minor Garbage Collection

Figure 6:
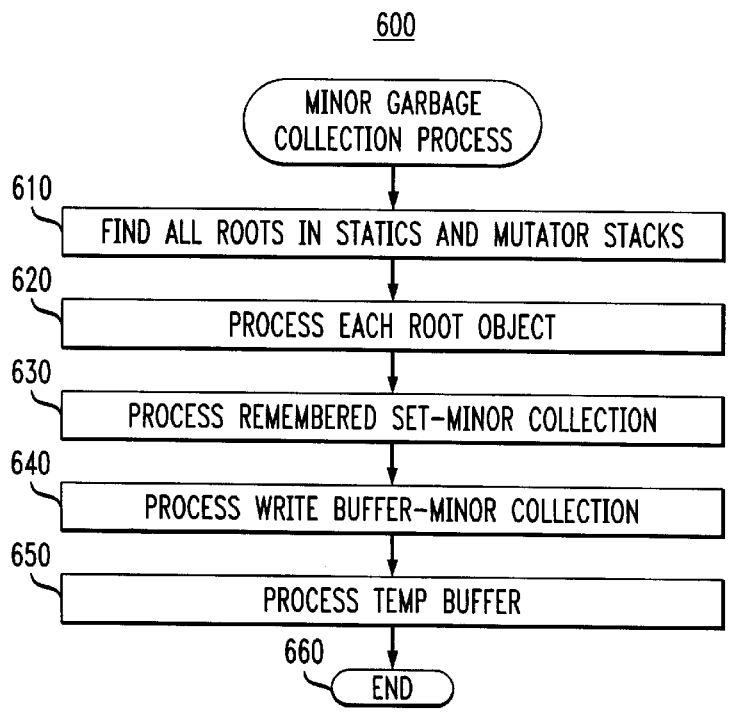
FIGS. 6 through 11 are flow charts illustrating the minor garbage collection process and related subroutines incorporating features of the present invention.

FIG. 6 is a flow chart describing an exemplary minor garbage collection process 600 in accordance with the present invention. As shown in FIG. 6, the minor garbage collection process 600 initially identifies all the root. pointers and objects to be processed in the statics (global pointer variables) and mutator stacks for the current minor garbage collection during step 610. A root pointer is a memory location of a program which is not contained in an object, but which contains a reference to an object. Such memory locations are statically allocated as part of the program text, and are referred to as "statics," or are local variables of program procedures (methods in the object-oriented literature), allocated and freed on the execution stack of the program. Root pointers are typically updated as the program executes. A root object or "root" is an object that is pointed to by a root pointer.

The root pointers and objects are identified, for example, using the stacks containing local thread storage and global pointer variables and by scanning objects in the remembered set 172 and the write buffer 175. For a more detailed discussion of the identification of root pointers and objects, see, for example, Jones and Rafael Lins, "Garbage Collection," 4, 37, 62 and 228, John Wiley & Sons Ltd., 1996, incorporated by reference herein. The root objects and all objects reachable from root objects are known to be live.

Figure 7:
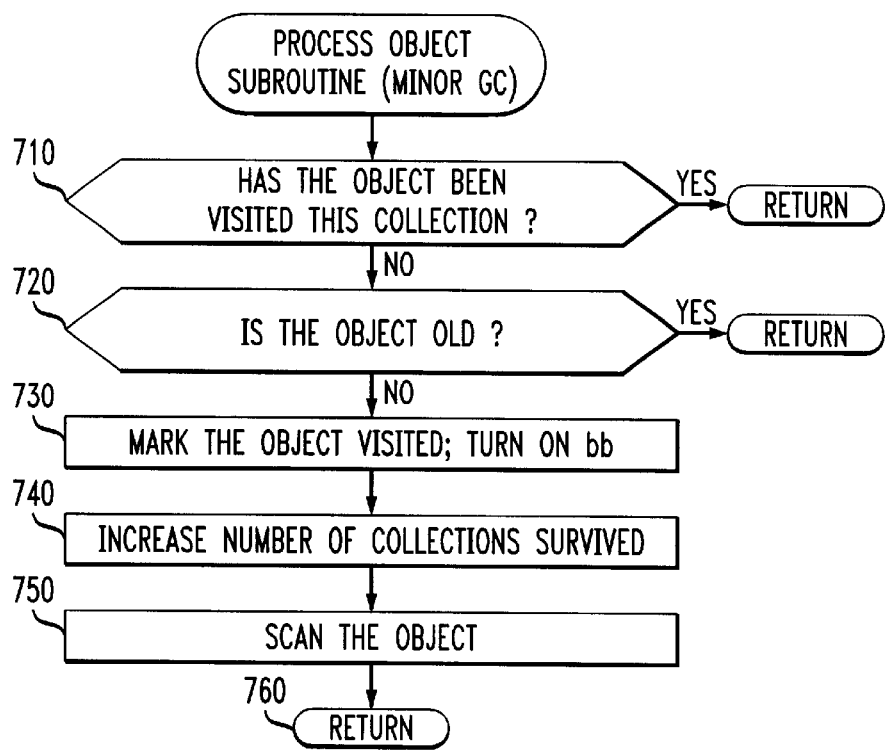
Figure 8:
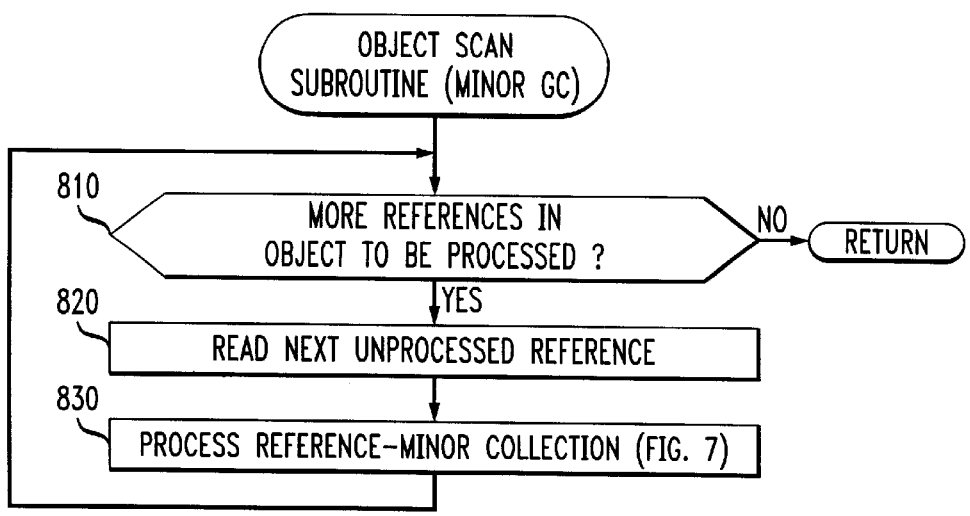

The identified root objects are processed during step using a process object subroutine (minor garbage collection) 700, discussed further below in conjunction with FIG. 7, and a scanning subroutine 800, shown in FIG. 8. Generally, the process object subroutine 700 and the scanning subroutine 800 recursively process each root object and all objects reachable from root objects until all objects have been scanned.

The remembered set 172 is then processed during step 630 using a process remembered set subroutine (minor garbage collection) 900, discussed below in conjunction with FIG. 9. Generally, the process remembered set subroutine 900 processes each object in the remembered set 172. According to features of the present invention, the process remembered set subroutine (minor garbage collection) 900 uses the garbage collection counter to determine if each old object entry has expired and processes the middle-aged objects using the temporary buffer 178.

As shown in FIG. 6, the write buffer 175 is processed by the minor garbage collection process 600 during step 640 using a process write buffer subroutine (minor garbage collection) 1000, discussed below in conjunction with FIG. 10. Generally, the process write buffer subroutine 1000 processes each object in the write buffer 175. According to features of the present invention, the process write buffer subroutine 1000 processes the middle-aged objects using the temporary buffer 178 and turns on the barrier bit again (that was turned off when the object was placed in the barrier bit during step 560 of the barrier write process 500.

Finally, the temporary buffer 178 is processed during step 650 using a process temporary buffer subroutine (minor garbage collection) 1100, discussed below in conjunction with FIG. 11. Generally, the process temporary buffer subroutine 1100 is executed at the end of the minor garbage collection to process all of the middle-aged objects that were placed in the temporary buffer 178 during the minor garbage collection because they were not known to be live. Thus, for each entry in the temporary buffer 178, the process temporary buffer subroutine 1100 places the object in the remembered set 172 if live, and discards the object if not live. The minor garbage collection process 600 then terminates during step 660.

As previously indicated, the minor garbage collection process 600 executes an object processing subroutine (minor garbage collection) 700 during step 620 to recursively process each root object and all objects pointed to by a root object in a chain until all objects have been scanned. As shown in FIG. 7, the object processing subroutine 700 initially performs a test during step 710 to determine if the current object has previously been visited on this garbage collection. If it is determined during step 710 that the current object has previously been visited on this garbage collection, then program control returns to the calling function.

If, however, it is determined during step 710 that the current object has not previously been visited on this garbage collection, then a further test is performed during step 720 to determine if the object is old. Thus, the minor garbage collection process 600 will bypass the old objects here and only process middle-aged and young objects. Thus, if it is determined during step 720 that the current object is an old object, then program control returns to the calling function.

If, however, it is determined during step 720 that the current object is not an old object, then the object is processed during steps 730 through 750. Specifically, the object is marked as visited during step 730 and the number of collections survived for the object is incremented during step 740, each in a well-known manner. Thereafter, the object processing subroutine 700 executes a scanning subroutine 800, shown in FIG. 8, to recursively process each root object and all objects pointed to by a root object in a chain until all objects have been scanned. The object processing subroutine 700 returns to the calling function during step 760.

As previously indicated, the object processing subroutine 700 executes a scanning subroutine (minor garbage collection) 800 during step 750 to scan each of the objects to be scanned. The scanning subroutine 800 recursively processes each root object and all objects pointed to by a root object in a chain until all objects have been scanned. As shown in FIG. 8, the scanning subroutine 800 initially performs a test during step 810 to determine if there are more references in the current object to be scanned. If it is determined during step 810 that there are more references to be scanned, then processing of the scanning subroutine 800 is complete and program control returns to the calling function.

If, however, it is determined during step 810 that there are more references to be scanned, then a pointer or reference is selected during step 820. The pointer is removed from the set and the object is accessed. Thereafter, the scanning subroutine 800 will execute the process object subroutine 700 during step 830. Thereafter, program control returns to 810 and continues in the manner described above. In this manner, all objects and all objects pointed to by the object are scanned recursively.

Figure 9:
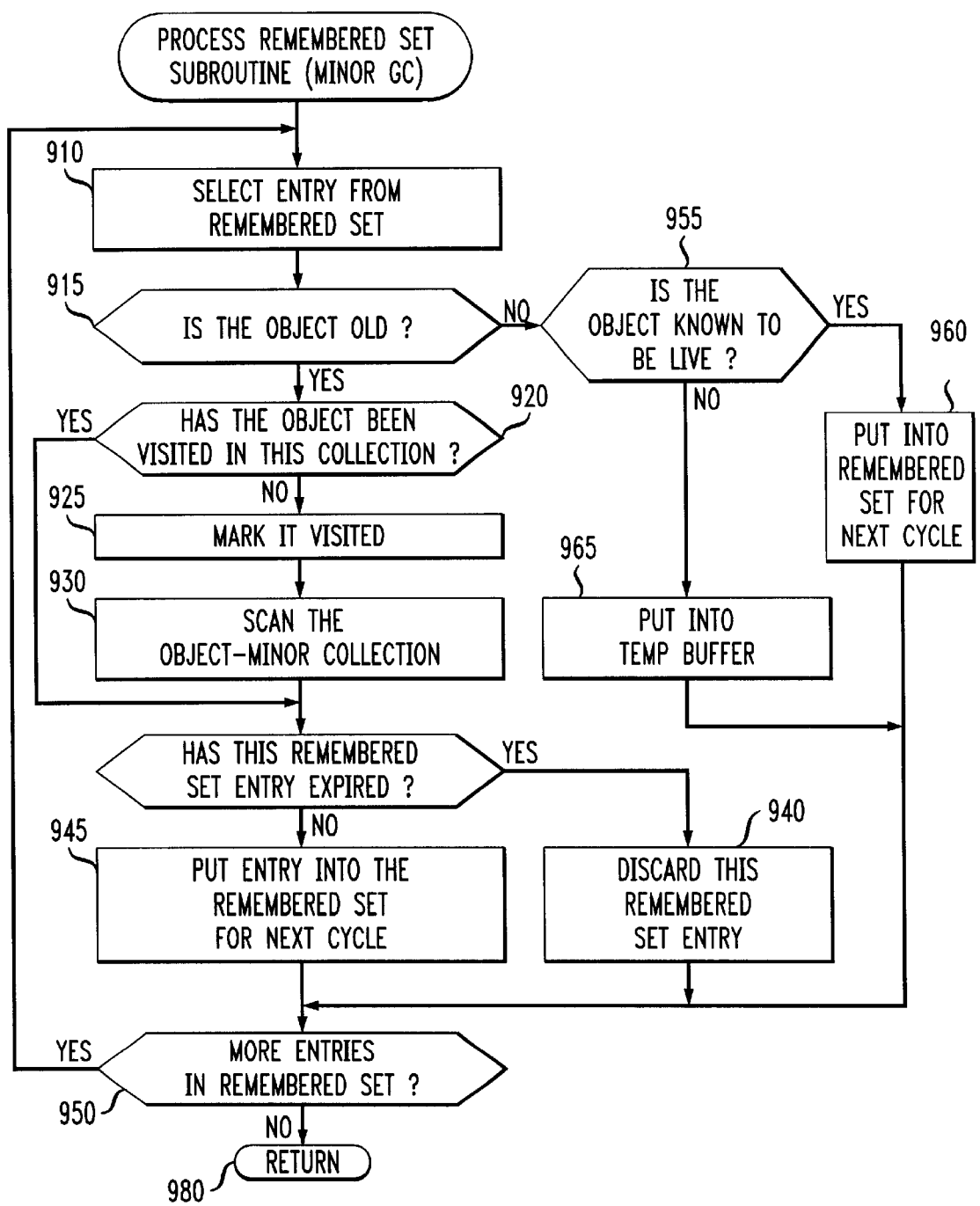

As previously indicated, the minor garbage collection process 600 executes a process remembered set subroutine (minor garbage collection) 900, shown in FIG. 9, to process the remembered set 172. Generally, the process remembered set subroutine 900 processes each object in the remembered set 172. According to features of the present invention, the process remembered set subroutine 900 uses the garbage collection counter to determine if each old object entry has expired and processes the middle-aged objects using the temporary buffer 178.

As shown in FIG. 9, the process remembered set subroutine 900 initially selects an entry from the remembered set 172 during step 910. Thereafter, a test is performed during step 915 to determine if the current object is old. If it is determined during step 915 that the current object is old, then a further test is performed during step 920 to determine if the current object has been previously visited during the current minor garbage collection. If it is determined during step 920 that the current object has been previously visited during the current minor garbage collection, then program control proceeds to step 935, discussed below.

If, however, it is determined during step 920 that the current object has not been previously visited during the current minor garbage collection, then the object is marked as visited during step 925, and the object is scanned during step 930 using the object scan subroutine 800, discussed above. A further test is performed during step 935 to determine if the current entry in the remembered set 172 has expired. As previously indicated, each entry in the remembered set 172 has an associated counter, C indicating the garbage collection cycle during which the entry was created. Since the object can no longer point to young objects after N garbage collection cycles, the entry can expire after garbage collection cycle C+N.

If it is determined during step 935 that the current entry in the remembered set 172 has expired, then the entry is discarded during step 940 and program control proceeds to step 950. If, however, it is determined during step 935 that the current entry in the remembered set 172 has not expired, then the entry is returned to the remembered set 172 during step 945 for the next garbage collection cycle.

A test is performed during step 950 to determine if there are additional entries in the remembered set 172 to be processed. If it is determined during step 950 that there are additional entries in the remembered set 172 to be processed, then program control returns to step 910 and continues in the manner described above. If, however, it is determined during step 950 that there are no additional entries in the remembered set 172 to be processed, then program control terminates during step 980.

If it was determined during step 915 that the current object is not old, then a further test is performed during step 955 to determine if the object is known to be live (i.e., has already been visited during the current garbage collection). If it is determined during step that the object is known to be live, then the object is treated as an old object and is placed in the remembered set 172 during step 960 before program control proceeds to step 950 and continues in the manner described above.

If, however. it is determined during step 955 that the object is not known to be live, then the object is placed in the temporary buffer 178 in accordance with the present invention before program control proceeds to step 950 and continues in the manner described above.

Figure 10:
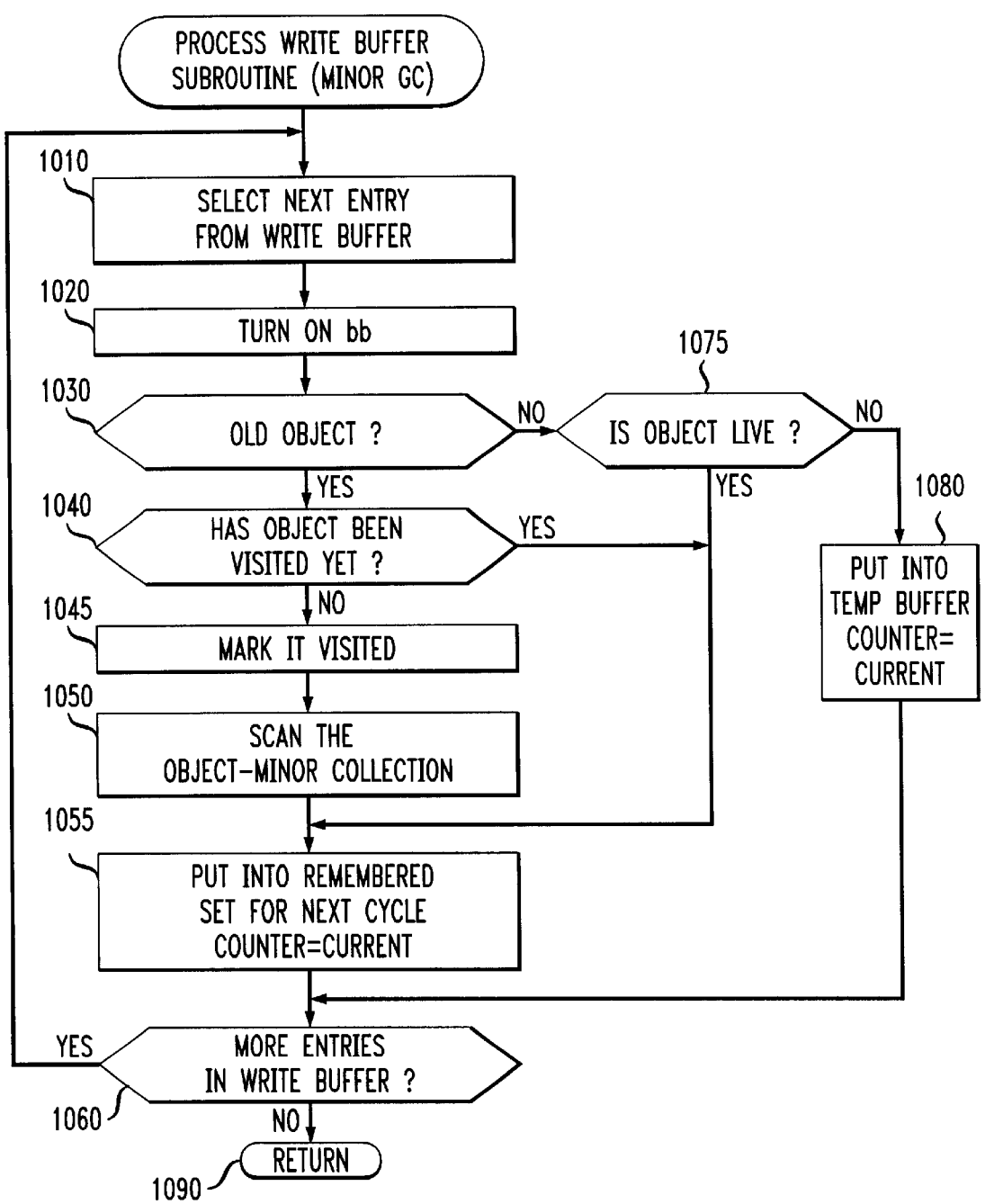

As previously indicated, the minor garbage collection process executes a process write buffer subroutine (minor garbage collection) 1000, shown in FIG. 10, to process the write buffer 175. Generally, the process write buffer subroutine 1000 processes each object in the write buffer 175. According to features of the present invention, the process write buffer subroutine 1000 processes the middle-aged objects using the temporary buffer 178 and turns on the barrier bit again (that was turned off when the object was placed in the barrier bit during step 560 of the barrier write process 500.

As shown in FIG. 10, the process write buffer subroutine 1000 initially retrieves an entry from the write buffer 175 during step 1010. Thereafter, the process write buffer subroutine 1000 turns on the barrier bit for the object (which was turned off by the barrier write process 500) during step 1020. A test is performed during step 1030 to determine if the object is old. If it is determined during step 1030 that the current object is old, then a further test is performed during step 1040 to determine if the current object has been previously visited during the current minor garbage collection. If it is determined during step 1040 that the current object has been previously visited during the current minor garbage collection, then program control proceeds to step 1055, discussed below.

If, however, it is determined during step 1040 that the current object has not been previously visited during the current minor garbage collection, then the object is marked as visited during step 1045, and the object is scanned during step 1050 using the object scan subroutine 800, discussed above. A pointer to the object is then placed in the remembered set 172 with a garbage collection counter, during step 1055. A further test is performed during step 1060 to determine if there are additional entries in the write buffer 175 to be processed. If it is determined during step 1060 that there are additional entries in the write buffer 175 to be processed, then program control returns to step 1010 and continues in the manner described above. If, however, it is determined during step 1060 that there are no additional entries in the write buffer 175 to be processed, then program control terminates during step 1090.

If it was determined during step 1030 that the current object is not old, then a further test is performed during step 1075 to determine if the object is known to be live (i.e., has already been visited during the current garbage collection). If it is determined during step 1075 that the object is known to be live, then the object is treated as an old object and is placed in the remembered set 172 during step 1055 and continues in the manner described above.

If, however, it is determined during step 1075 that the object is not known to be live, then the object is placed in the temporary buffer 178 during step 1080 in accordance with the present invention before program control proceeds to step 1060 and continues in the manner described above.

Figure 11:
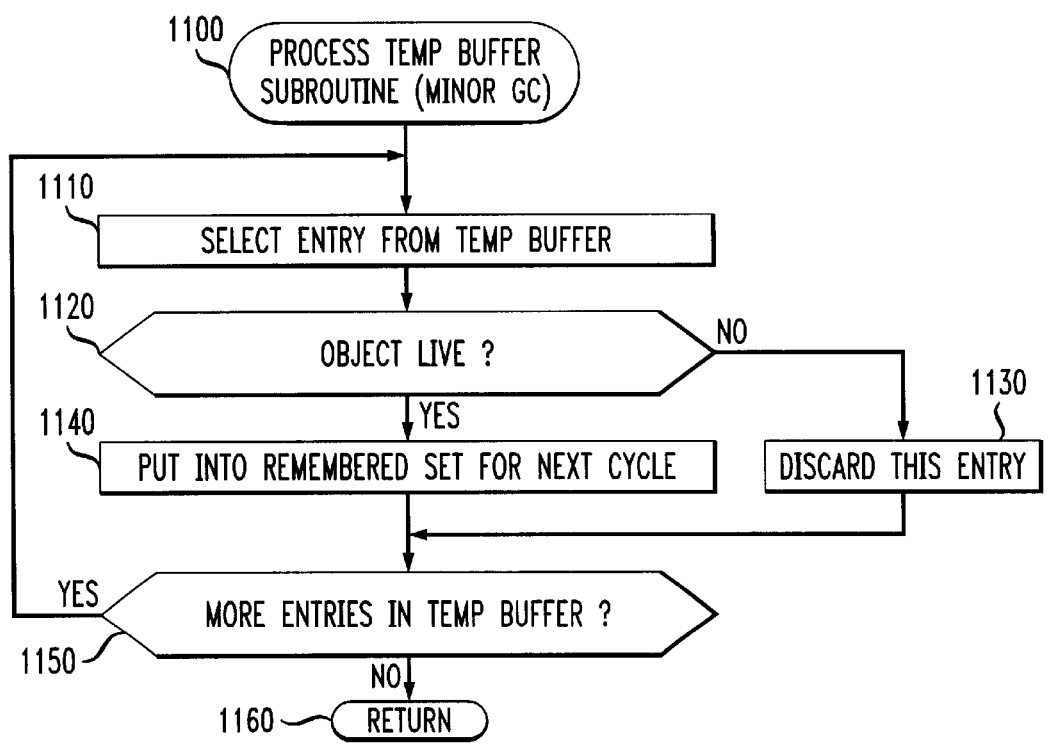

As previously indicated, the minor garbage collection process 600 executes a process temporary buffer subroutine (minor garbage collection) 1100, shown in FIG. 11, during step 650 to process the temporary buffer 178. Generally, the process temporary buffer subroutine 1100 process all of the middle-aged objects that were placed in the temporary buffer 178 during the minor garbage collection because they were not known to be live. Thus, for each entry in the temporary buffer 178, the process temporary buffer subroutine 1100 places the object in the remembered set 172 if live, and discards the object if not live.

As shown in FIG. 11, the process temporary buffer subroutine 1100 initially selects an entry from the temporary buffer 178 during ste 1110. A test is then performed during step 1110 to determine if the object is known to be live (i.e., has already been visited during the current garbage collection). If it is determined during step 1110 that the object is known to be live, then the object is treated as an old object and is placed in the remembered set 172 during step 1140.

A test is then performed during step 1150 to determine if there are additional entries in the temporary buffer 178 to be processed. If it is determined during step 1150 that there are additional entries in the temporary buffer 178 to be processed, then program control returns to step 1110 and continues in the manner described above. If, however, it is determined during step 1150 that there are no additional entries in the temporary buffer 178 to be processed, then program control terminates during step 1160.

If it was determined during step 1120 that the object is not known to be live, then the object is discarded during 1130 before program control proceeds to step 1150 and continues in the manner described above.

Major Garbage Collection

Figure 12:
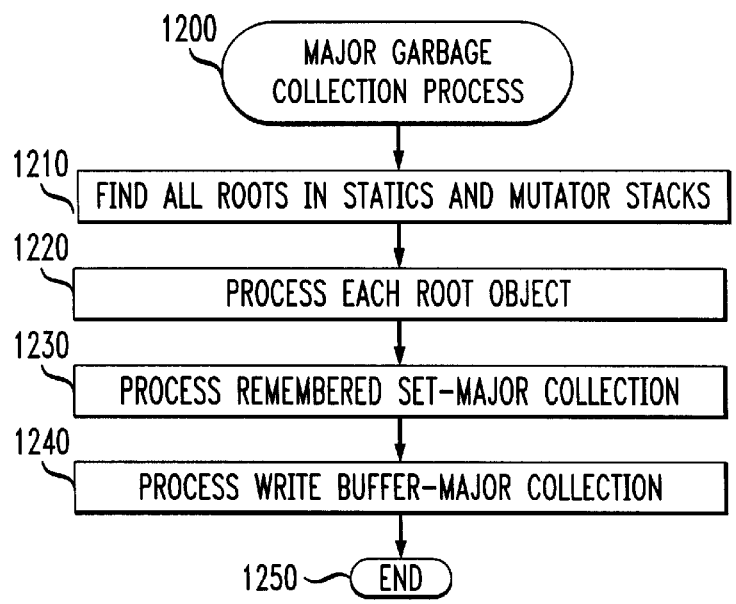
FIGS. 12 through 16 are flow charts illustrating the major garbage collection process and related subroutines incorporating features of the present invention.

FIG. 12 is a flow chart describing an exemplary major garbage collection process 1200 in accordance with the present invention. As shown in FIG. 12, the major garbage collection process 1200 initially identifies all the root pointers and objects to be processed in the statics (global pointer variables) and mutator stacks for the current major garbage collection during step 1210. As previously indicated, a root pointer is a memory location of a program which is not contained in an object, but which contains a reference to an object. Such memory locations are statically allocated as part of the program text, and are referred to as "statics," or are local variables of program procedures (methods in the object-oriented literature), allocated and freed on the execution stack of the program. Root pointers are typically updated as the program executes. A root object or "root" is an object that is pointed to by a root pointer.

The root pointers and objects are identified, for example, using the stacks containing local thread storage and global pointer variables and by scanning objects in the remembered set 172 and the write buffer 175. For a more detailed discussion of the identification of root pointers and objects, see, for example, Jones and Rafael Lins, "Garbage Collection," 4, 37, 62 and 228, John Wiley & Sons Ltd., 1996, incorporated by reference herein. The root objects and all objects pointed to by root objects are known to be live.

Figure 13:
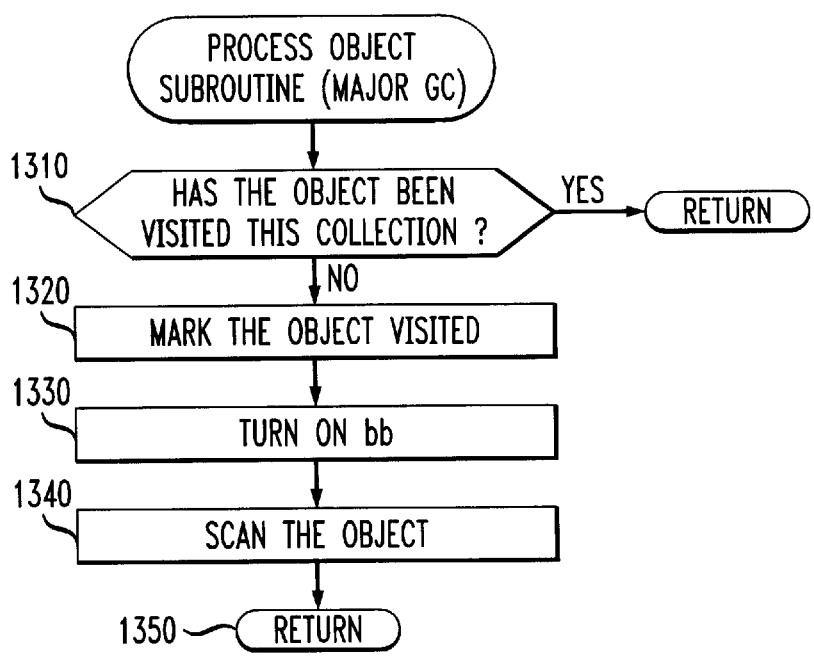

The identified root objects are processed during step 1220 using a process object subroutine (major garbage collection) 1300, discussed further below in conjunction with FIG. 13. Generally, the process object subroutine 1300 recursively processes each root object and all objects pointed to by a root object in a chain until all objects have been scanned.

At the end of step 1220 all live objects have been reached and scanned. These objects are retained, and those not reached are garbage and their storage is reclaimed. The remembered set and write buffer are not used as roots for a major collection, since all reached objects are scanned, regardless of age.

As part of a major garbage collection, it is necessary to compute the remembered set 172 to use for subsequent minor garbage collections. The conventional approach is to do this while scanning all objects reachable from roots. However, this requires performing an age test for each object being scanned to determine if the object is old or middle aged and, if old, an age test for each object that is referenced is performed to determine the age of the youngest object it references, in order to determine if the object should be included in the next remembered set 172.

A feature of the present invention is to compute the next remembered set 172 using the existing remembered set 172 and the existing write buffer 175. This is beneficial because the number of objects in the remembered set 172 and write buffer 175 are generally a small fraction of the total number of live objects. The existing remembered set 172 must be processed to remove entries for objects that no longer qualify. Because of the filtering provided by the barrier bit, the write buffer 175 contains object references for old or middle-aged objects that had pointers modified in the last mutator cycle, and thus contains those objects which are candidates for addition to the remembered set 172. The write buffer 175 must be processed to determine the subset of modified old objects which now qualify for inclusion in the remembered set 172. The use of the existing remembered set 172 and write buffer 175 to compute the next remembered set is represented by steps 1230 and 1240, respectfully, in FIG. 12.

Thus, the remembered set 172 is processed during step 1230 using a process remembered set subroutine (major garbage collection) 1500, discussed below in conjunction with FIG. 15. Generally, the process remembered set subroutine 1500 processes each object in the remembered set 172. According to features of the present invention, the process remembered set subroutine 1500 uses the garbage collection counter to determine if each old object entry has expired.

As shown in FIG. 12, the write buffer 175 is processed by the major garbage collection process 1200 during step 1240 using a process write buffer subroutine (major garbage collection) 1600, discussed below in conjunction with FIG. 16. Generally, the process write buffer subroutine (major garbage collection) 1600 processes each object in the write buffer 175. According to features of the present invention, the process write buffer subroutine 1600 turns on the barrier bit again (that was turned off when the object was placed in the barrier bit during step 560 of the barrier write process 500. The major garbage collection process 1200 then terminates during step 1250.

As previously indicated, the major garbage collection process 1200 executes an object processing subroutine (major garbage collection) 1300 during step 1220 to recursively process each root object and all objects pointed to by a root object in a chain until all objects have been scanned. As shown in FIG. 13, the object processing subroutine 1300 initially performs a test during step 1310 to determine if the current object has previously been visited on this garbage collection. If it is determined during step 1310 that the current object has previously been visited on this garbage collection, then program control returns to the calling function.

If, however, it is determined during step 1310 that the current object has not previously been visited on this garbage collection, then the object is processed during steps 1320 through 13400. Specifically, the object is marked as visited during step 1320 and the number of collections survived for the object is incremented during step 1330, each in a well-known manner. Thereafter, the object processing subroutine 1300 executes a scanning subroutine 1400, shown in FIG. 14, to recursively process each root object and all objects pointed to by a root object in a chain until all objects have been scanned. The object processing subroutine 1300 returns to the calling function during step 1350.

Figure 14:
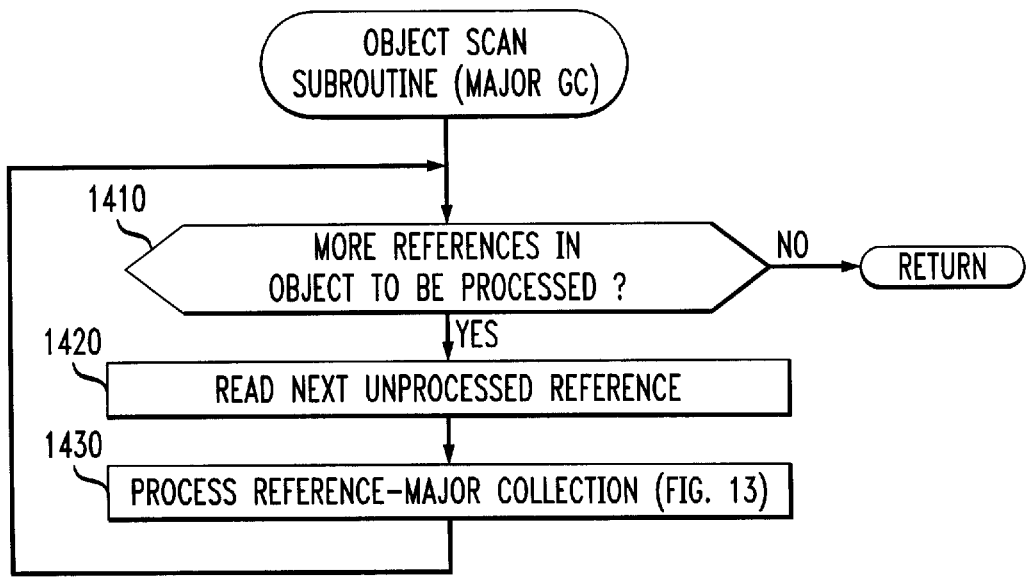

As previously indicated, the object processing subroutine 1300 executes a scanning subroutine (major garbage collection) 1400 during step 1340 to scan each of the objects to be scanned. The scanning subroutine 1400 recursively processes each root object and all objects pointed to by a root object in a chain until all objects have been scanned. As shown in FIG. 14, the scanning subroutine 1400 initially performs a test during step 1410 to determine if there are more references in the current object to be scanned. If it is determined during step 1410 that there are no more references to be scanned, then processing of the scanning subroutine 1400 is complete and program control returns to the calling function.

If, however, it is determined during step 1410 that there are more references to be scanned, then a pointer or reference is selected during step 1420. The pointer is removed from the set and the object is accessed. Thereafter, the scanning subroutine 1400 will execute the process object subroutine 1300 during step 1430. Thereafter, program control returns to step 1410 and continues in the manner described above. In this manner, all objects and all objects pointed to by the object are scanned recursively.

Figure 15:
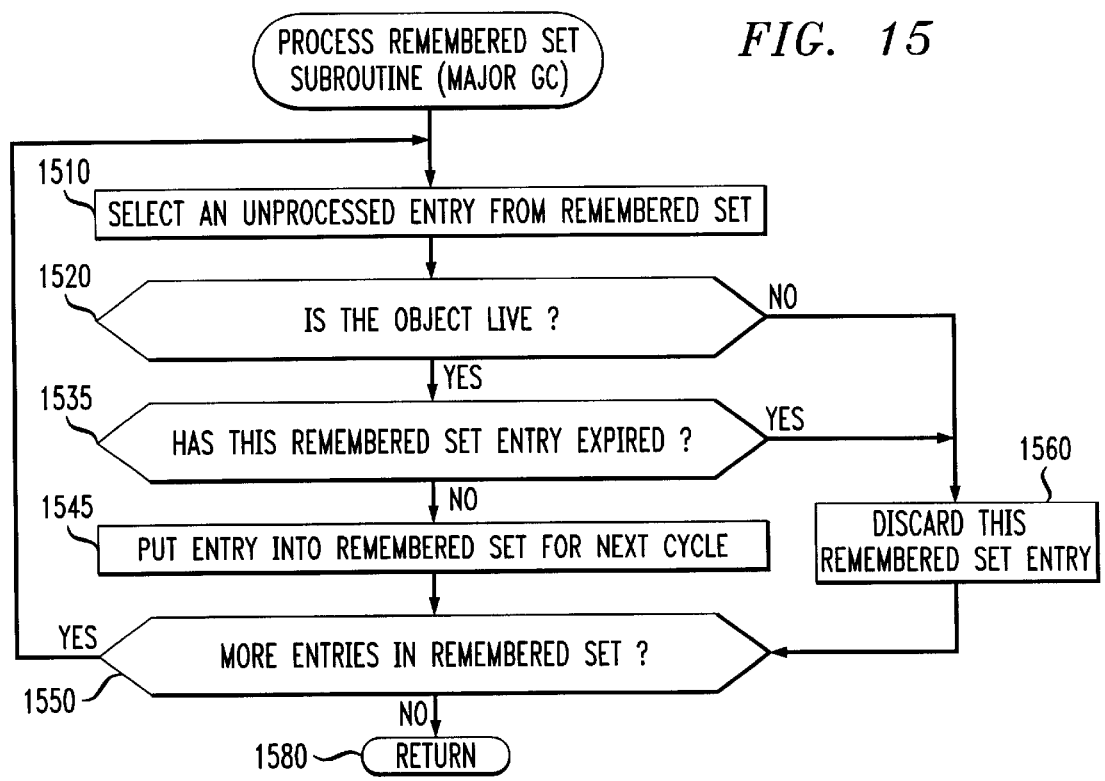

As previously indicated the major garbage collection process 1200 executes a process remembered set subroutine (major garbage collection) 1500, shown in FIG. 15, to process the remembered set 172. Generally, the process remembered set subroutine 1500 processes each object in the remembered set 172. According to features of the present invention, the process remembered set subroutine 900 uses the garbage collection counter to determine if each old object entry has expired.

As shown in FIG. 15, the process remembered set subroutine 1500 initially selects an entry from the remembered set 172 during step 1510. Thereafter, a test is performed during step 1520 to determine if the object is known to be live (i.e., has already been visited during the current garbage collection). If it is determined during step 1510 that the object is known to be live, then a further test is performed during step 1535 to determine if the current entry in the remembered set 172 has expired. As previously indicated, each entry in the remembered set 172 has an associated counter, C indicating the garbage collection cycle during which the entry was created. Since the object can no longer point to young objects after N garbage collection cycles, the entry can expire after garbage collection cycle C+N.

If it is determined during step 1535 that the current entry in the remembered set 172 has expired, then the entry is discarded during step 1560 and program control proceeds to step 1550, discussed below. If, however, it is determined during step 1535 that the current entry in the remembered set 172 has not expired, then the entry is returned to the remembered set 172 during step 1545 for the next garbage collection cycle.

A test is performed during step 1550 to determine if there are additional entries in the remembered set 172 to be processed. If it is determined during step 1550 that there are additional entries in the remembered set 172 to be processed, then program control returns to step 1510 and continues in the manner described above. If, however, it is determined during step 1550 that there are no additional entries in the remembered set 172 to be processed, then program control terminates during step 1580.

Figure 16:
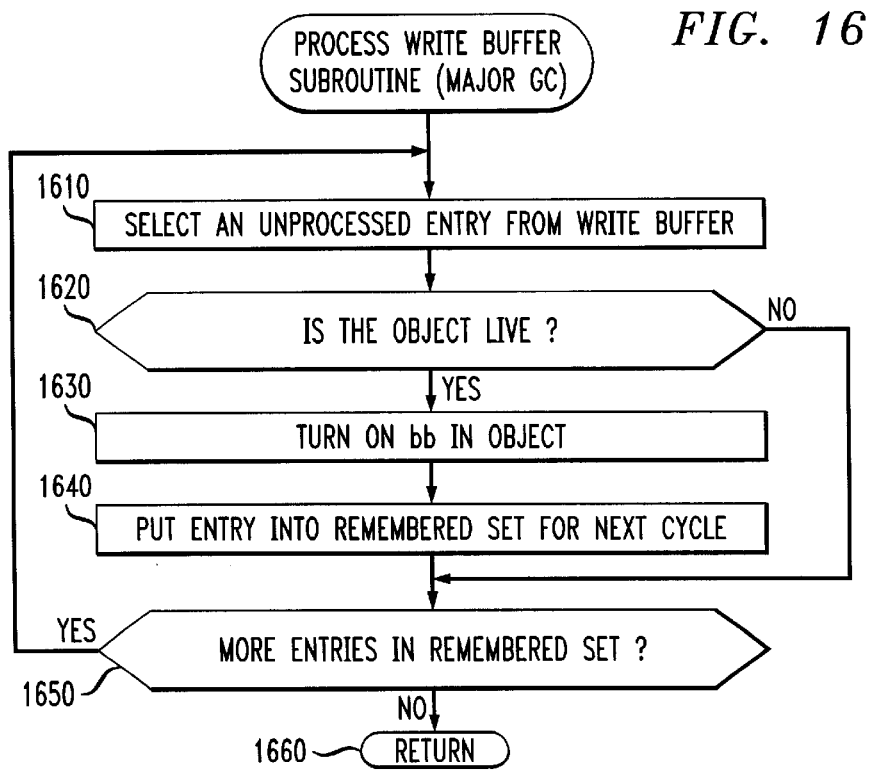

As previously indicated, the major garbage collection process 1200 executes a process write buffer subroutine (major garbage collection) 1600, shown in FIG. 16, to process each object in the write buffer 175. According to features of the present invention, the process write buffer subroutine 1600 turns on the barrier bit again (that was turned off when the object was placed in the barrier bit during step 560 of the barrier write process 500.

As shown in FIG. 16, the process write buffer subroutine 1600 initially retrieves an entry from the write buffer 175 during step 1610. Thereafter, the process write buffer subroutine 1600 performs a test during step 1620 to determine if the object is known to be live (i.e., has already been visited during the current garbage collection). If it is determined during step 1620 that the object is not known to be live, then program control proceeds to step 1650 (without adding the object to the remembered set 172), discussed below.

If, however, it is determined during step 1620 that the object is known to be live, then the barrier bit for the object (which was turned off by the barrier write process 500) is turned on again during step 1630. The object is then placed in the remembered set 172 for the next cycle during step 1640. A test is performed during step 1650 to determine if there are additional entries in the write buffer 175 to be processed. If it is determined during step 1650 that there are additional entries in the write buffer 175 to be processed, then program control returns to step 1610 and continues in the manner described above. If, however, it is determined during step 1650 that there are no additional entries in the write buffer 175 to be processed, then program control terminates during step 1660.

It is to be understood that the embodiments and variations shown and described herein are merely illustrative of the principles of this invention and that various modifications may be implemented by those skilled in the art without departing from the scope and spirit of the invention.

What is claimed is:

1. In a computer system comprising a heap that stores a plurality of objects that are logically partitioned into at least a set of old objects that have each survived at least a predetermined number N of reclamation operations, a set of middle-aged objects that have each survived at least a predetermined number M of reclamation operations, wherein M is less than N, and a third set of objects distinct from said old and middle-aged sets of objects, and wherein the computer system performs a plurality of reclamation operations that use a remembered set to reclaim space in the heap, a method for maintaining the remembered set comprising the steps of:

providing said remembered set from a previous reclamation operation;

identifying said old or middle-aged objects that include an object reference that has been modified since the last reclamation operation; and creating an entry in a remembered set for a next reclamation period for a middle-aged object that is live and (i) identified in said remembered set from a previous reclamation operation or (ii) identified as having an object reference that has been modified since the last reclamation operation.

2. The method of claim 1, wherein said remembered set entry has an associated counter, C, indicating said reclamation operation when said entry was created.

3. The method of claim 2, further comprising the step of discarding said entry when said reclamation operation has a value of C plus N.

4. The method of claim 2, wherein said counter, C, is decremented for each reclamation operation and wherein said corresponding entry is discarded when said counter value is zero.

5. The method of claim 1, wherein said identifying step further comprises the step of storing an indication of said modified object in at least one table of entries.

6. The method of claim 1, wherein said identifying step employs a card marking scheme.

7. The method of claim 1, wherein said remembered sets identify (i) a given object in said set of old objects that contains an object reference to an object in the set of middle-aged objects or the third set of objects; or (ii) a given object in said set of middle-aged objects that contains an object reference to an object in the third set of objects.

8. The method of claim 1, wherein said creating step further comprises the step of creating an entry in said remembered set for said next reclamation period only for objects in said set of middle-aged objects that contain an object reference to an object in the third set of objects.

9. The method of claim 1, wherein said creating step further comprises the step of creating an entry in said remembered set for all objects in the set middle-aged objects that are (i) identified in said remembered set from a previous reclamation operation, or (ii) identified as having an object reference that has been modified since the last reclamation operation.

10. In a computer system comprising a heap that stores a plurality of objects that are logically partitioned into at least a set of old objects that have each survived at least a predetermined number N of reclamation operations, a set of middle-aged objects that have each survived at least a predetermined number M of reclamation operations, wherein M is less than N, and a third set of objects distinct from said old and middle-aged sets of objects, and wherein the computer system performs a plurality of reclamation operations that use a remembered set to reclaim space in the heap, a method for maintaining the remembered set comprising the steps of:

providing said remembered set from a previous reclamation operation;

identifying said old or middle-aged objects that include an object reference that has been modified since the last reclamation operation; and creating an entry in a remembered set for a next reclamation period for an old object that is (i) identified in said remembered set from a previous reclamation operation, or (ii) identified as having an object reference that has been modified since the last reclamation operation.

11. The method of claim 10, wherein said remembered set entry has an associated counter, C, indicating said reclamation operation when said entry was created.

12. The method of claim 11, further comprising the step of discarding said entry when said reclamation operation has a value of C plus N.

13. The method of claim 11, wherein said counter, C, is decremented for each reclamation operation and wherein said corresponding entry is discarded when said counter value is zero.

14. The method of claim 10, wherein said identifying step further comprises the step of storing an indication of said modified object in at least one table of entries.

15. The method of claim 10, wherein said identifying step employs a card marking scheme.

16. The method of claim 10, wherein said remembered sets identify (i) a given object in said set of old objects that contains an object reference to an object in the set of middle-aged objects or the third set of objects; or (ii) a given object in said set of middle-aged objects that contains an object reference to an object in the third set of objects.

17. The method of claim 10, wherein said creating step further comprises the step of creating an entry in said remembered set for said next reclamation period only for objects in said set of old objects that contain an object reference to an object in the set of middle-aged objects or the third set of objects.

18. The method of claim 10, wherein said creating step further comprises the step of creating an entry in said remembered set for all objects in the set of old objects that are (i) identified in said remembered set from a previous reclamation operation, or (ii) identified as having an object reference that has been modified since the last reclamation operation.

19. In a computer system comprising a heap that stores a plurality of objects that are logically partitioned into at least a set of old objects that have each survived at least a predetermined number N of reclamation operations, a set of middle-aged objects that have each survived at least a predetermined number M of reclamation operations, wherein M is less than N, and a third set of objects distinct from said old and middle-aged sets of objects, and wherein the computer system performs a plurality of reclamation operations that use a remembered set to reclaim space in the heap, a method for maintaining the remembered set comprising the steps of:

providing said remembered set from a previous reclamation operation;

identifying said old or middle-aged objects that include an object reference that has been modified since the last reclamation operation; and creating an entry in a table of entries during one of said reclamation operations for a middle-aged object that is not known to be live and is (i) identified in said remembered set from a previous reclamation operation, or (ii) identified as having an object reference that has been modified since the last reclamation operation.

20. The method of claim 19, further comprising the steps of processing entries in said table following said reclamation operation and creating an entry in said remembered set for a next reclamation operation for a middle-aged object identified in said table that is live.

21. The method of claim 19, further comprising the steps of processing entries in said table following said reclamation operation and discarding an entry in said table for a middle-aged object identified in said table that is not known to be live.

22. The method of claim 19, wherein said remembered set entry has an associated counter, C, indicating said reclamation operation when said entry was created.

23. The method of claim 21, further comprising the step of discarding said entry when said reclamation operation has a value of C plus N.

24. The method of claim 21, wherein said counter, C, is decremented for each reclamation operation and wherein said corresponding entry is discarded when said counter value is zero.

25. The method of claim 19, wherein said identifying step further comprises the step of storing an indication of said modified object in at least one table of entries.

26. The method of claim 19, wherein said identifying step employs a card marking scheme.

27. The method of claim 19, wherein said remembered set identifies (i) a given object in said set of old objects that contains an object reference to an object in the set of middle-aged objects or the third set of objects; or (ii) a given object in said set of middle-aged objects that contains an object reference to an object in the third set of objects.

28. The method of claim 19, wherein said creating step further comprises the step of creating an entry in said table only for objects in said set of middle-aged objects that are not known to be live and contain an object reference to an object in the third set of objects.

29. The method of claim 10, wherein said creating step further comprises the step of creating an entry in said table of entries for all objects in the set of middle-aged objects that are not known to be live and are (i) identified in said remembered set from a previous reclamation operation, or (ii) identified as having an object reference that has been modified\ since the last reclamation operation.

30. A generational garbage collection manager for a remembered set in a system that stores a plurality of objects that are logically partitioned into at least a set of old objects that have each survived at least a predetermined number N of reclamation operations, a set of middle-aged objects that have each survived at least a predetermined number M of reclamation operations, wherein M is less than N, and a third set of objects distinct from said old and middle-aged sets of objects, and wherein the computer system performs a plurality of reclamation operations that use a remembered set to reclaim space in the heap, said generational garbage collection manager comprising:

a memory that stores computer-readable code; and a processor operatively coupled to said memory, said processor configured to implement said computer-readable code, said computer-readable code configured to:

provide said remembered set from a previous reclamation operation;

identify said old or middle-aged objects that include an object reference that has been modified since the last reclamation operation; and create an entry in a remembered set for a next reclamation period for a middle-aged object that is live and (i) identified in said remembered set from a previous reclamation operation or (ii) identified as having an object reference that has been modified since the last reclamation operation.

31. A generational garbage collection manager for a remembered set in a system that stores a plurality of objects that are logically partitioned into at least a set of old objects that have each survived at least a predetermined number N of reclamation operations, a set of middle-aged objects that have each survived at least a predetermined number M of reclamation operations, wherein M is less than N, and a third set of objects distinct from said old and middle-aged sets of objects, and wherein the computer system performs a plurality of reclamation operations that use a remembered set to reclaim space in the heap, said generational garbage collection manager comprising:

a memory that stores computer-readable code; and a processor operatively coupled to said memory, said processor configured to implement said computer-readable code, said computer-readable code configured to:

provide said remembered set from a previous reclamation operation;

identify said old or middle-aged objects that include an object reference that has been modified since the last reclamation operation; and create an entry in a remembered set for a next reclamation period for an old object that is (i) identified in said remembered set from a previous reclamation operation, or (ii) identified as having an object reference that has been modified since the last reclamation operation.

32. A generational garbage collection manager for a remembered set in a system that stores a plurality of objects that are logically partitioned into at least a set of old objects that have each survived at least a predetermined number N of reclamation operations, a set of middle-aged objects that have each survived at least a predetermined number M of reclamation operations, wherein M is less than N, and a third set of objects distinct from said old and middle-aged sets of objects, and wherein the computer system performs a plurality of reclamation operations that use a remembered set to reclaim space in the heap, said generational garbage collection manager comprising:

a memory that stores computer-readable code; and a processor operatively coupled to said memory, said processor configured to implement said computer-readable code, said computer-readable code configured to:

provide said remembered set from a previous reclamation operation;

identify said old or middle-aged objects that include an object reference that has been modified since the last reclamation operation; and create an entry in a table of entries during one of said reclamation operations for a middle-aged object that is not known to be live and is (i) identified in said remembered set from a previous reclamation operation, or (ii) identified as having an object reference that has been modified since the last reclamation operation.

33. A program storage device readable by a machine, tangibly embodying a program of instructions executable by the machine to perform method steps for managing a generational garbage collection system for a remembered set in a system that stores a plurality of objects that are logically partitioned into at least a set of old objects that have each survived at least a predetermined number N of reclamation operations, a set of middle-aged objects that have each survived at least a predetermined number M of reclamation operations, wherein M is less than N, and a third set of objects distinct from said old and middle-aged sets of objects, and wherein the computer system performs a plurality of reclamation operations that use a remembered set to reclaim space in the heap, said method steps comprising:

providing said remembered set from a previous reclamation operation;

identifying said old or middle-aged objects that include an object reference that has been modified since the last reclamation operation; and creating an entry in a remembered set for a next reclamation period for a middle-aged object that is live and (i) identified in said remembered set from a previous reclamation operation or (ii) identified as having an object reference that has been modified since the last reclamation operation.

34. A program storage device readable by a machine, tangibly embodying a program of instructions executable by the machine to perform method steps for managing a generational garbage collection system for a remembered set in a system that stores a plurality of objects that are logically partitioned into at least a set of old objects that have each survived at least a predetermined number N of reclamation operations, a set of middle-aged objects that have each survived at least a predetermined number M of reclamation operations, wherein M is less than N, and a third set of objects distinct from said old and middle-aged sets of objects, and wherein the computer system performs a plurality of reclamation operations that use a remembered set to reclaim space in the heap, said method steps comprising:

providing said remembered set from a previous reclamation operation;

identifying said old or middle-aged objects that include an object reference that has been modified since the last reclamation operation; and creating an entry in a remembered set for a next reclamation period for an old object that is (i) identified in said remembered set from a previous reclamation operation, or (ii) identified as having an object reference that has been modified since the last reclamation operation.

35. A program storage device readable by a machine, tangibly embodying a program of instructions executable by the machine to perform method steps for managing a generational garbage collection system for a remembered set in a system that stores a plurality of objects that are logically partitioned into at least a set of old objects that have each survived at least a predetermined number N of reclamation operations, a set of middle-aged objects that have each survived at least a predetermined number M of reclamation operations, wherein M is less than N, and a third set of objects distinct from said old and middle-aged sets of objects, and wherein the computer system performs a plurality of reclamation operations that use a remembered set to reclaim space in the heap, said method steps comprising:

providing said remembered set from a previous reclamation operation;

identifying said old or middle-aged objects that include an object reference that has been modified since the last reclamation operation; and creating an entry in a table of entries during one of said reclamation operations for a middle-aged object that is not known to be live and is (i) identified in said remembered set from a previous reclamation operation, or (ii) identified as having an object reference that has been modified since the last reclamation operation.

* * * * *